Figure 1:
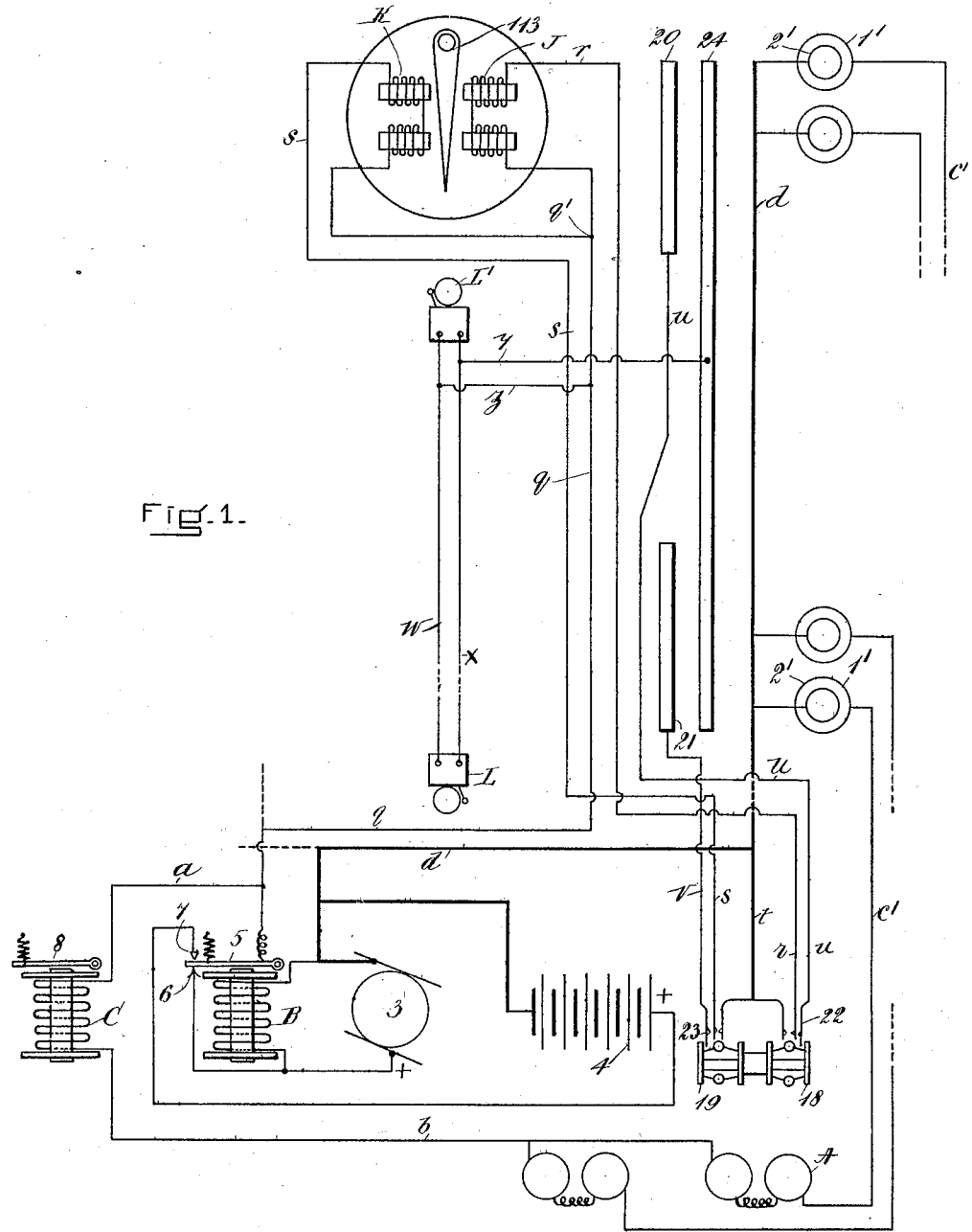

W. K. QUEEN & T. F. PICKETT.
DIRECTION INDICATOR FOR ELECTROMECHANICAL TELEGRAPH SYSTEMS.
APPLICATION FILED JULY 10, 1912.

1,091,242.

Patented Mar. 24, 1914.
5 SHEETS—SHEET 1.

W. K. QUEEN & T. F. PICKETT.
DIRECTION INDICATOR FOR ELECTROMECHANICAL TELEGRAPH SYSTEMS.
APPLICATION FILED JULY 10, 1912.

1,091,242. Patented Mar. 24, 1914.
5 SHEETS—SHEET 2.

W. K. QUEEN & T. F. PICKETT.
DIRECTION INDICATOR FOR ELECTROMECHANICAL TELEGRAPH SYSTEMS.
APPLICATION FILED JULY 10, 1912.

1,091,242.

Patented Mar. 24, 1914.

5 SHEETS—SHEET 3.

W. K. QUEEN & T. F. PICKETT.
DIRECTION INDICATOR FOR ELECTROMECHANICAL TELEGRAPH SYSTEMS.
APPLICATION FILED JULY 10, 1912.

1,091,242.

Patented Mar. 24, 1914.
5 SHEETS—SHEET 4.

W. K. QUEEN & T. F. PICKETT.
DIRECTION INDICATOR FOR ELECTROMECHANICAL TELEGRAPH SYSTEMS.
APPLICATION FILED JULY 10, 1912.
1,091,242.
Patented Mar. 24, 1914.
5 SHEETS—SHEET 5.
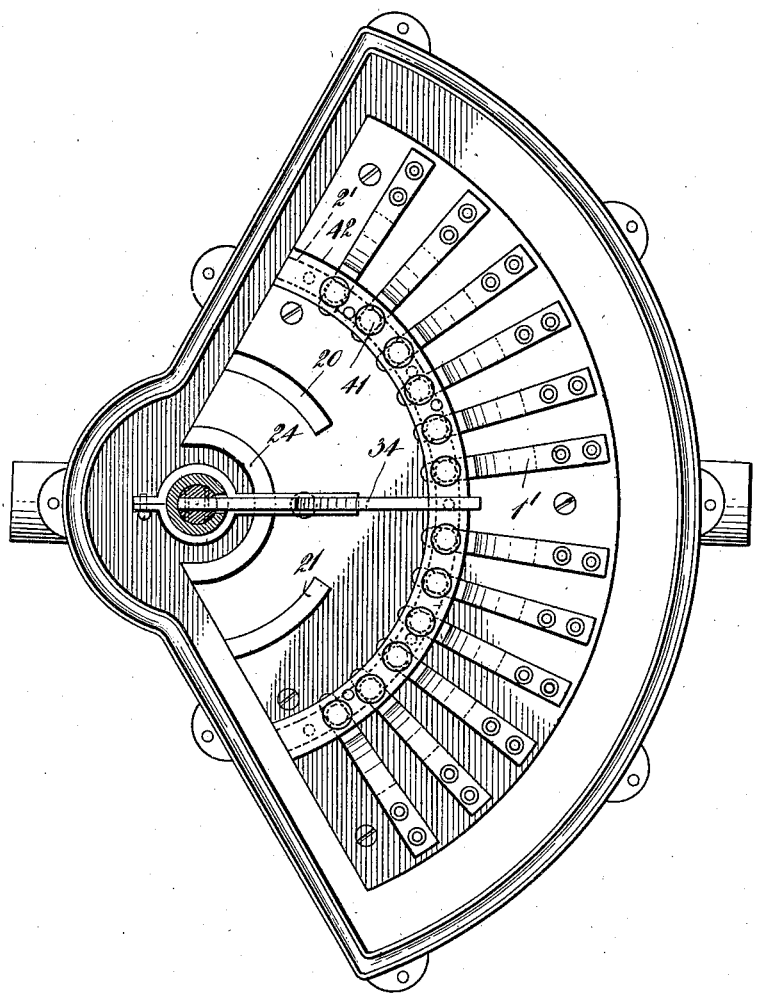
Fig-7-

UNITED STATES PATENT OFFICE.

WALTER K. QUEEN AND THORNTON F. PICKETT, OF NEEDHAM HEIGHTS, MASSACHUSETTS, ASSIGNORS TO THE Q-P SIGNAL COMPANY, A CORPORATION OF MASSACHUSETTS.

DIRECTION-INDICATOR FOR ELECTROMECHANICAL-TELEGRAPH SYSTEMS.

1,091,242.     Specification of Letters Patent.     Patented Mar. 24, 1914.

Original application filed June 17, 1910, Serial No. 567,470. Divided and this application filed July 10, 1912. Serial No. 708,651.

*To all whom it may concern:*

Be it known that we, WALTER K. QUEEN and THORNTON F. PICKETT, a citizen of the United States and a subject of the King of England, respectively, and residents of Needham Heights, county of Norfolk, and State of Massachusetts, have invented a new and useful Improvement in Direction-Indicators for Electromechanical-Telegraph Systems, of which the following is a specification.

Our invention relates to electro-mechanical telegraph systems and more especially to such systems which are adapted for the transmission of visual and audible signals from the pilot house or navigation bridge of a vessel to the engine room and vice versa.

This application is a division of our application Serial No. 567,470, filed June 17, 1910, for improvements in electro-mechanical telegraph systems wherein we have claimed the system *per se.*

It is desirable in such telegraph systems that the pilot house or navigation bridge be provided with an engine-shaft-controlled visual-signal showing the direction in which the engines are running, and with an auxiliary apparatus for giving an audible alarm in both pilot-house, or bridge, and engine room when the engine is running in the opposite direction to that which was signaled from the pilot-house or bridge.

It is the object of the present invention to provide a system whereby a visual signal controlled by the shaft of the engine is automatically transmitted from the engine room to the pilot house, or bridge, showing the direction in which the engine is running, together with an audible signal giving a continuous alarm in the pilot - house or bridge, as the case may be, or in the engine room, or both in the pilot-house, or bridge, and engine room when the engine is running in the direction opposite to that which was signaled from the pilot-house or bridge.

Our invention will be particularly described by reference to the drawings which accompany and form a part of this specification, and which illustrate one form of apparatus and one arrangement of circuits whereby the foregoing object may be effected.

Figure 2:
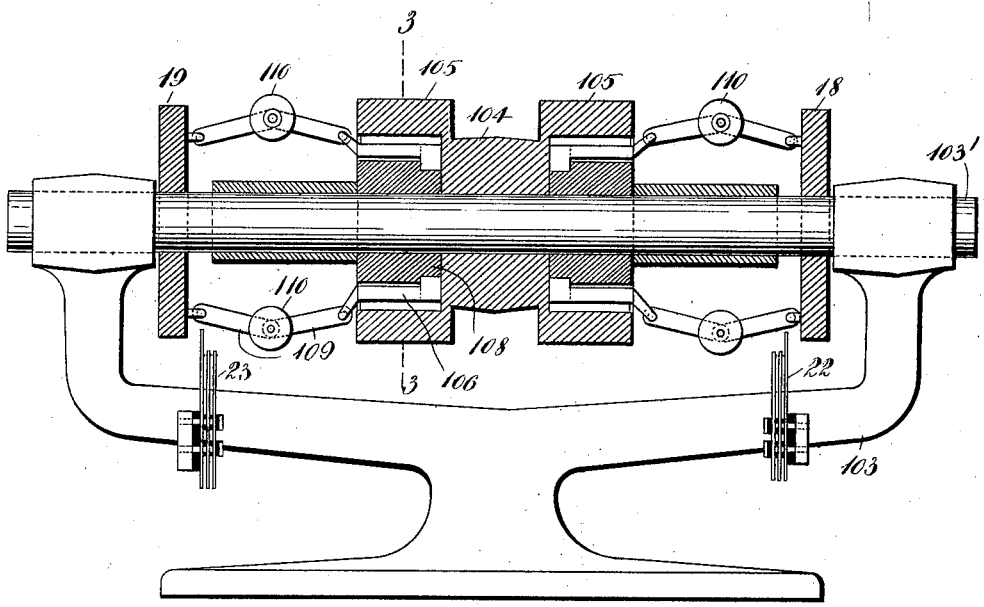
Figure 3:
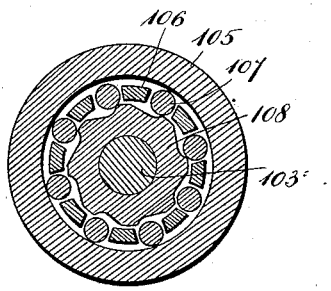
Figure 4:
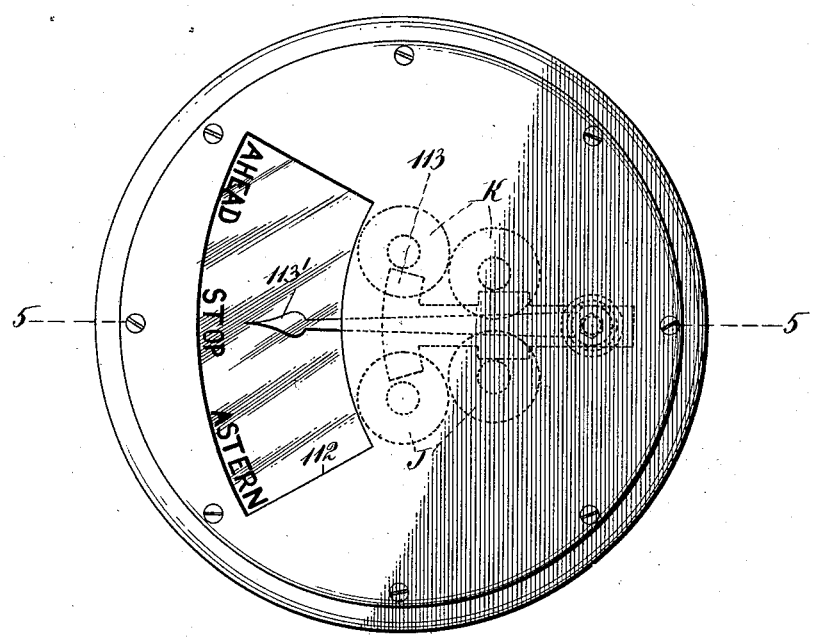
Figure 5:
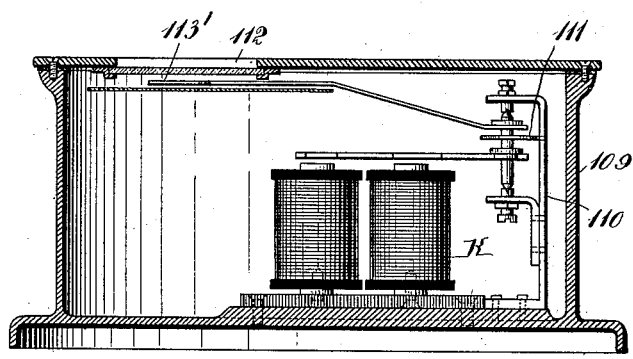
Figure 6:
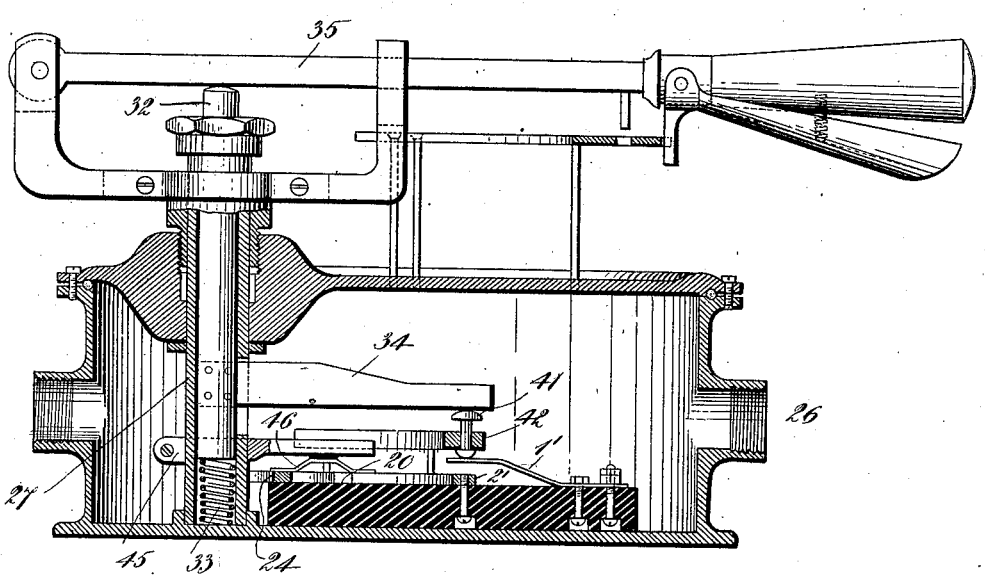

In the drawings, Figure 1 is a diagram of one arrangement of circuits which may be employed in connection with the apparatus shown in the other figures. Fig. 2 is an elevation, partly in section, of the engine-shaft-controlled transmitter or circuit-closer for the direction indicator or the visual signal showing the direction in which the engine is running. Fig. 3 is a section on the line 3—3 of Fig. 2. Fig. 4 is a plan view of the direction-indicator. Fig. 5 is a vertical section taken on the line 5—5 of Fig. 4, certain parts being shown in elevation. Fig. 6 is a central section of one form of transmitter that may be employed to actuate the telegraph system in connection with which the present invention is employed. Fig. 7 is a plan view of said transmitter with the cover removed.

In the particular drawings selected for more fully illustrating our invention, 103 represents a suitable standard carrying bearings for the auxiliary shaft 103', on which is loosely mounted the pulley 104 arranged to be driven by the engine-shaft in any suitable manner, as for example by a belt running over another pulley on the engine shaft. The pulley 104 may be made integral with the clutch casings 105, each of which incloses the roll-cage 106 and the rolls 107. The clutch wedges 108 are oppositely arranged so that as the pulley rotates in one direction, one set of rollers will ride up on the cam surfaces of the clutch wedge and jam between said wedge and clutch casing, and cause the rotation of one roll-cage while the other set runs idle, and vice versa, in the usual well known manner. The circuit-closing disks 18 and 19 are mounted to move longitudinally of the shaft and each is connected with one of the roll-cages by the toggle 109 carrying the weights 110. It will be obvious that the rotation of the main engine shaft and the resulting rotation of the auxiliary shaft 103 in one direction, for example, ahead, will be instrumental in drawing the circuit-closing disk 19 along the shaft to close the spring-contact-members 23, and that the opposite rotation of said shafts astern will cause the circuit-closing disk 18 to move along the shaft 103' to the left to close the spring-contact members 22.

The direction-indicator visual-signal, located as above stated in the pilot house or on the bridge, consists in the present instance of a casing 109 having a cover secured thereto by a moisture-proof joint, and carrying a standard 110 by which the pivots of the armature 113 and pointer 113′ are supported. The magnets J, K, secured to the base of said casing, operate to move said armature and pointer against the tension of a resilient member, such as the spiral spring 111, to show, by reference to a suitable dial over which the pointer moves, the direction of rotation of the engines, said member normally holding said pointer in its central position when the engine is at rest and the circuits of both magnets are open.

Referring to Fig. 1, the source 3, which may be any suitable form of dynamo electric machine, is connected in series with the current-supply-control relay B, a shunt circuit connecting one pole thereof, herein shown as the positive pole, to the front-contact 6 of said relay. When the said source is in operation, the relay B is energized and the armature 5 is held against said front-contact, so that the system will be energized by current flowing from said positive pole by way of said front-contact and armature. If for any reason the generator 3 should be shut down, the resulting deënergization of the relay B will allow the armature 5 to fall forward against the back-contact 7 whereupon current will flow to the system from the positive terminal of the storage- or other battery 4 by way of said back-contact and armature 5. The magnet C with its armature 8 controls the apparatus of the order-signaling system. When the terminals 1 1′ are closed, current from the source energizes a signal-selecting magnet A, one terminal of each of which is connected to the conductor b and the other terminals of which end at 1′, being connected thereto by the conductors c′. The circuit is as follows: from the positive terminal of the source 3 to the front-contact 6 of the relay B which controls the particular current source employed, to the armature 5 thereof, thence by conductor a to the relay C, then by way of the conductor b to one of the magnets A, thence by way of one of the conductors c′ to one of the sets of terminal contacts 1′ 2′ and back to the source by the common return conductor d.

A transmitter particularly well adapted for closing the circuits of the magnets A at the point 1′ 2′ is claimed in our application Serial No. 708749, filed simultaneously herewith. Referring to Figs. 6 and 7 wherein said transmitter is illustrated, the several conductors controlled thereby enter the casing through the conduits 26 and are connected with the spring-contacts 1′ and the contact strips 20, 21 and 24 respectively. The return conductor d is connected with the contact strip 2′.

When the lever 35 is rotated so as to bring the arm 34 to its proper position, and is thereupon depressed, the plunger 32 is forced downward against the resistance of the spring 33 and causing the arm 34 to push one of the studs 41 against a spring-contact 1′ until the latter makes contact with the strip 2′. The arm 45, which is clamped to the tube 27 carries the spring-contact member 46, which is insulated therefrom, and bridges either pair of contact members 20—24 or 21—24 according to one of the extreme positions of the lever 35. The contact-strip 24 is arranged as shown in Fig. 7 so as always to be in contact with the member 46. The contact-strip 20 is arranged to be in contact with the member 46 so long as the lever 35 is in position to send a certain pre-determined signal, for example, a signal directing the engine to run ahead, and the contact-strip 21 is arranged to be in contact with the member 46 so long as said lever is in position to send a signal of different character, for example, a signal directing the engine to run astern.

It will now be plain, referring to Fig. 1, that the order-signal transmitter or device employed for closing the contacts 1′ and 2′ must be provided with a member for bridging the strips 20—24 or 21—24, in order to carry out the object of our invention.

When the engine is running ahead and the contacts at 23 are closed, the circuits of the direction-indicator may be traced as follows: from the positive terminal of the source 3 to the front contact 6, armature 5, conductor q, point q′, through the windings of the magnet K, conductor s, which terminates in the central contact at 23, to the right hand contact at 23 and thence back to the other terminal of the source by way of the conductor t and common return wire d. When the engine is running astern and the contacts at 22 are closed, the circuit of the direction-indicator may be traced as follows: from the positive terminal of the source through to the back-contact 6, armature 5, conductor q to the point q′, thence through the windings of the magnet J, conductor r, which terminates in the central contact 22, to the left hand contact at 22, and thence back to the other terminal of the source by way of the conductor t and common return conductor d.

As before stated, when the lever 35 of the transmitter switch is in position to transmit a signal ordering the engines to proceed ahead, the contact strips 20, 24 are bridged by the spring-contact 46. Should the engineer misunderstand the signal and send the engines astern, thereby causing the disk 18 to close the contacts at 22, a continuous alarm will be given both in the pilot-house and engine room by the bells or other wrong-direction-alarm apparatus L L′, the circuits of which, each normally open at two points, under such condition are traced as follows: from the positive terminal of the source 3 to the front-contact 6, armature 5, conductor q, conductor z, through the windings of the alarm magnets L L', conductor y, contact-strip 24, bridging-contact 46, contact-strip 20, conductor u which terminates in the right-hand contact at 22, left-hand contact at 22 (the contacts at 22 being closed by the disk 18 when the engine is running astern) and thence back to the other terminal of the source by way of the conductor t and the common return wire d. Similarly, should the engines be sent ahead when "astern" has been signaled, the circuit of the wrong-direction-alarm apparatus is traced as follows: from the positive terminal of the source 3 to the front-contact 6, armature 5, conductor q, conductor z through the windings of the alarm magnets L L', conductor y, contact-strip 24, bridging-contact 46, contact-strip 21, conductor v which terminates in the left-hand member of the contacts 23, right-hand contact at 23, (the contacts at 23 being closed by the disk 19 when the engine is running ahead) and thence back to the other terminal of the source by way of the conductor t and common return conductor d. The actuation of the direction alarms L L' will enable the engineer to rectify his mistake, whereupon the circuit of said alarms will be opened at the contacts 22 or 23.

We do not wish to limit ourselves to the exact mechanism or circuit arrangements hereinbefore described, inasmuch as it is obvious that many modifications may be made, both in the apparatus and in the circuits connecting the same, without departing from the principle of our invention.

We claim:

1. In a telegraph system, a wrong-direction-alarm apparatus, a source of current, a circuit connecting said source and said apparatus, a transmitting apparatus, means mechanically connected to said transmitting apparatus for directly closing said circuit at one point, and an engine-shaft-controlled circuit-closer for closing the same at another point, said circuit-closer being arranged to keep said circuit closed while the engine is running and to open the same when the engine stops.

2. In a telegraph system, a source of current, an electro-responsive direction-indicator, a wrong-direction-alarm apparatus, circuits connecting said source with said direction-indicator and said apparatus, an engine-shaft-controlled circuit-closer controlling both circuits, a transmitting apparatus, and means mechanically connected to said transmitting-apparatus for directly controlling the circuit of said wrong-direction-alarm apparatus, said circuit-closer being arranged to keep said circuits closed while the engine is running and to open the same when the engine stops.

3. In a telegraph system, a signal apparatus, a signal-selecting magnet, signal-controlling means, a source of current associated with said signal-selecting magnet and signal-controlling means, an electro-responsive direction-indicator, a wrong-direction-alarm apparatus, circuits connecting said source with said direction-indicator and said apparatus, an engine-shaft-controlled circuit-closer controlling both circuits, and a transmitting apparatus controlling the circuit of said wrong-direction-alarm apparatus, said circuit-closer being arranged to keep said circuits closed while the engine is running and to open the same when the engine stops.

4. In a telegraph system, a signal apparatus at a receiving station, a transmitting apparatus at a transmitting station, a source of current, means associating said signal apparatus and transmitting apparatus with said source, a wrong-direction-alarm apparatus at one of said stations, a circuit connecting said source and said wrong-direction-alarm apparatus, an engine-shaft-controlled circuit-closer at said receiving station for closing said circuit at one point, and means mechanically connected to said transmitting apparatus for directly closing the same at another point, said circuit-closer being arranged to keep said circuit closed while the engine is running and to open the same when the engine stops.

5. In a telegraph system, a signal apparatus at a receiving station, a transmitting apparatus at a transmitting station, a source of current, means associating said signal apparatus and transmitting apparatus with said source, a wrong-direction-alarm apparatus at both of said stations, a circuit connecting said source and said wrong-direction-alarm apparatus, an engine-shaft-controlled circuit-closer at said receiving station for closing said circuit at one point, and means mechanically connected to said transmitting apparatus for directly closing the same at another point, said circuit-closer being arranged to keep said circuit closed while the engine is running and to open the same when the engine stops.

6. In a telegraph system, a signal apparatus at a receiving station, a transmitting apparatus at a transmitting station, a source of current, means associating said signal apparatus and transmitting apparatus with said source, a wrong-direction-alarm apparatus at one of said stations, a circuit connecting said source and said wrong-direction-alarm apparatus, said circuit being normally open at two points, means mechanically connected to said transmitting apparatus for directly closing said circuit at one of said points, and an engine-shaft-controlled circuit-closer at said receiving station for closing said circuit at the other of said points when the engine-shaft is driven in a direction opposite to that signaled by said transmitting apparatus, said circuit-closer being arranged to keep said circuit closed while the engine is running and to open the same when the engine stops.

7. In a telegraph system, a signal apparatus at a receiving station, a transmitting apparatus at a transmitting station, a source of current, means associating said signal apparatus and transmitting apparatus with said source, a wrong-direction-alarm apparatus at one of said stations, a circuit connecting said source and said wrong direction alarm apparatus, said circuit being normally open at two points, means mechanically connected to said transmitting apparatus for directly closing said circuit at one of said points, and an engine-shaft-controlled circuit-closer at said receiving station for closing said circuit at the other of said points when the engine-shaft is driven in a direction opposite to that signaled by said transmitting apparatus, said circuit-closer being constructed to open said circuit at the last-mentioned point when the engine shaft is at rest.

8. In a telegraph system, a transmitting apparatus, a source of current, a wrong-direction-alarm apparatus, a circuit connecting said source and said wrong-direction-alarm apparatus, said circuit being normally open at two points, means mechanically connected to said transmitting apparatus for directly closing said circuit at one of said points, and an engine-shaft-controlled circuit-closer at said receiving station for closing said circuit at the other of said points when the engine-shaft is driven in a direction opposite to that signaled by said transmitting apparatus, said circuit-closer being arranged to keep said circuit closed while the engine is running and to open the same when the engine stops.

9. In a telegraph system, a transmitting apparatus, a source of current, a wrong-direction-alarm apparatus, a circuit connecting said source and said wrong-direction-alarm apparatus, said circuit being normally open at two points, means mechanically connected to said transmitting apparatus for directly closing said circuit at one of said points, and an engine-shaft-controlled circuit-closer at said receiving station for closing said circuit at the other of said points when the engine-shaft is driven in a direction opposite to that signaled by said transmitting apparatus, said circuit-closer being constructed to open said circuit at the last-mentioned point when the engine shaft is at rest.

10. In a telegraph system, a source of current, an electro-responsive direction-indicator, a circuit connecting said source of current and said indicator, and an engine-shaft-controlled circuit-closer controlling said circuit, said circuit-closer comprising an auxiliary shaft, an engine-shaft-driven pulley loosely mounted on said auxiliary shaft, circuit-closing members slidably mounted on said auxiliary shaft, contact members arranged in the path of said circuit-closing members, respectively, and means depending on the direction of rotation of said pulley whereby motion longitudinally of said auxiliary shaft is imparted to said circuit-closing members.

11. In a telegraph system, a source of current, an electro-responsive direction-indicator, a circuit connecting said source of current and said indicator, and an engine-shaft-controlled circuit-closer controlling said circuit, said circuit-closer comprising an auxiliary shaft, an engine-shaft-driven pulley loosely mounted on said auxiliary shaft, circuit-closing members slidably mounted on said auxiliary shaft, contact members arranged in the path of said circuit-closing members, respectively, two reversely-arranged clutches on said auxiliary shaft, said clutches being associated with and operable by said pulley, and mechanical connections between said circuit-closing members and said clutches, respectively.

In testimony whereof, we have hereunto subscribed our names this 5th day of July 1912.

WALTER K. QUEEN.
THORNTON F. PICKETT.

Witnesses:
  Geo. K. Woodworth,
  E. B. Tomlinson.